(12) United States Patent
Brenden et al.

(10) Patent No.: US 7,432,694 B2
(45) Date of Patent: Oct. 7, 2008

(54) SYSTEMS AND METHODS FOR SENSED CURRENT-MODE FEEDBACK IN SWITCHING REGULATORS

(75) Inventors: Jason Brenden, Woodbury, MN (US); Brendan Lucore, Blaine, MN (US)

(73) Assignee: Agere Systems Inc., Allentown, PA (US)

( * ) Notice: Subject to any disclaimer, the term of this patent is extended or adjusted under 35 U.S.C. 154(b) by 258 days.

(21) Appl. No.: 11/535,967

(22) Filed: Sep. 27, 2006

(65) Prior Publication Data
US 2008/0074094 A1 Mar. 27, 2008

(51) Int. Cl.
*G05F 1/40* (2006.01)
(52) U.S. Cl. .................. 323/283; 323/285; 323/222; 363/21.04
(58) Field of Classification Search .......... 323/222, 323/282–288, 299; 363/16, 20, 21.04, 56.1, 363/96, 97; 527/535, 63
See application file for complete search history.

(56) References Cited

U.S. PATENT DOCUMENTS

| | | | |
|---|---|---|---|
| 4,672,518 A * | 6/1987 | Murdock | 363/21.04 |
| 4,686,617 A * | 8/1987 | Colton | 363/56.1 |
| 4,837,495 A * | 6/1989 | Zansky | 323/222 |
| 4,885,674 A * | 12/1989 | Varga et al. | 363/21.09 |
| 7,019,507 B1 * | 3/2006 | Dittmer et al. | 323/284 |

* cited by examiner

*Primary Examiner*—Rajnikant B Patel
(74) *Attorney, Agent, or Firm*—Hamilton, DeSanctis & Cha

(57) ABSTRACT

Various systems and methods for implementing feedback in a switching regulator are disclosed. For example, various current feedback circuits are disclosed that include a current feedback node and a sense node. In addition, the current feedback circuits include an operational amplifier with two inputs. One of the inputs is electrically coupled to a power source via a first resistor, and may further be electrically coupled to a ground by closing a first switch or to the sense node by closing a second switch. The other input is electrically coupled to the ground via a second resistor, and may further be electrically coupled to the sense node by closing a third switch or to the power source by closing a fourth switch. The operational amplifier drives the current feedback node.

24 Claims, 4 Drawing Sheets

SYSTEMS AND METHODS FOR SENSED CURRENT-MODE FEEDBACK IN SWITCHING REGULATORS

BACKGROUND OF THE INVENTION

The present invention is related to switching regulators. More particularly, the present invention is related to systems and methods for applying current-mode feedback to a switching regulator.

A switching regulator switches between two voltage points at a frequency that dictates an average output voltage. In some cases, the switching may be accomplished through use of a timer circuit that implements a constant frequency switching characteristic. In such cases, a current-mode feedback is not used, however, such timer based switching often occurs at a much slower rate than that achievable through the use of feedback circuitry reducing the efficiency of the regulator circuit. Further, in such cases, the switching must account for any load capacitance which is undesirable. Accounting for output capacitance, among other things, can result in relatively complex circuitry.

In part because of the aforementioned limitations, some switching regulator circuits include a feedback circuit that controls at least a portion of the switching. For example, in a hysteretic type regulator, a switching frequency will be determined by an external capacitor or other added resistance. A voltage drop across the external resistor is used to determine a current traversing the resistor. This current is fed back to the switching regulator, and the switching regulator in turn uses the feedback to guide switching processes. FIG. 1 shows a regulator output circuit 100 including such an external resistor 110. A node 140 connects external resistor 110 to a driving regulator circuit (not shown), and to a load 130 being driven by the regulator circuit. A capacitor 120 is in series with external resistor 110.

While external resistor 110 may alleviate the problems mentioned above in relation to the fixed frequency switching circuit, it introduces additional problems. For example, external resistor 110 may require additional cost and board space, and in any event external resistor 110 dissipates power during operation of the switching regulator. Further, a larger ripple is exhibited at node 140 when external resistor 110 is used. Alternatively, if the output is taken at a node 150, external resistor 110 directly contributes to output impedance which is undesirable in a regulator circuit.

Hence, for at least the aforementioned reasons, there exists a need in the art for advanced systems and methods for providing feedback in switching regulator circuits.

BRIEF SUMMARY OF THE INVENTION

The present invention is related to switching regulators. More particularly, the present invention is related to systems and methods for applying current-mode feedback to a switching regulator.

Some embodiments of the present invention provide current feedback circuits. Such current feedback circuits include a current feedback node and a sense node. In addition, the current feedback circuits include an operational amplifier with two inputs. One of the inputs is electrically coupled to a power source via a first resistor, and may further be electrically coupled to a ground by closing a first switch or to the sense node by closing a second switch. The other input is electrically coupled to the ground via a second resistor, and may further be electrically coupled to the sense node by closing a third switch or to the power source by closing a fourth switch. The operational amplifier drives the current feedback node.

In some cases, closing the first switch electrically couples the first input to the ground via a third resistor, and closing the second switch electrically couples the first input to the sense node via the third resistor. Further, closing the third switch electrically couples the sense node to the second input via the fourth resistor, and closing the fourth switch electrically couples the second input to the power source via the fourth resistor. In particular cases, the first, second, third and fourth resistors exhibit approximately the same value of resistance. Further, in some cases, a feedback resistor electrically couples the current feedback node to the first input, and another feedback resistor electrically couples the second node to a reference voltage. In one particular case, both of the feedback resistors exhibit approximately the same resistance value.

In some cases, the current feedback node is electrically coupled to an input of a switching regulator. The switching regulator may be, but is not limited to, a buck regulator or a buck boost regulator. In some cases, the switching regulator drives a charge node, and includes both a high side switch and a low side switch. The high side switch is operable to electrically couple the power source to the charge node when the high side switch is closed, and the low side switch is operable to electrically couple the charge node to the ground when the low side switch is closed.

In some cases, the charge node and the sense node are connected making the nodes the same node. In particular cases, the second switch closes whenever the low side switch is closed and the third switch is closed whenever the high side switch is closed. Further, the first switch is closed for at least a portion of the time that the high side switch is closed, and the fourth switch is closed for at least a portion of the time that the low side switch is closed.

In other cases, the switching regulator drives a charge node and includes both a high side switch and a low side switch. The high side switch is operable to electrically couple the power source to the charge node when the high side switch is closed, and the low side switch is operable to electrically couple the charge node to an output node when the low side switch is closed. In such cases, an inductor electrically couples the charge node to the ground. In such cases, the output node and the sense node may be electrically connected such that they are the same node.

Other embodiments of the present invention provide current feedback, switching regulator circuits. Such circuits include a regulator circuit and a current feedback circuit. The regulator circuit includes a high side switch and a low side switch. The high side switch is operable to cause charging when closed, and the low side switch is operable to cause discharging when closed. The current feedback circuit includes a current feedback node that drives switching of the high side switch and the low side switch, and a sense node that has a value representative of a current provided via a combination of the high side switch and the low side switch. The current feedback circuit further includes an operational amplifier with two inputs. One of the inputs is electrically coupled to a power source via a first resistor, and further electrically coupled to ground via a third resistor when a first switch is closed or electrically coupled to the sense node via the third resistor when a second switch is closed. The other input is electrically coupled to ground via a second resistor, and further electrically coupled to the sense node via a fourth resistor when a third switch is closed or to the power source via the fourth resistor when a fourth switch is closed. An output of the operational amplifier drives the current feedback node.

In some instances of the aforementioned embodiments, both the high side switch and the low side switch are electrically coupled to the sense node. Charging is caused when the high side switch is closed by electrically coupling the power source to the sense node through the high side switch, and discharging is caused when the low side switch is closed by electrically coupling the ground to the sense node through the low side switch. In other instances of the aforementioned embodiments, the high side switch and the low side switch are electrically coupled to a charging node that is electrically coupled to the ground via an inductor. Charging is caused when the high side switch is closed by electrically coupling the power source to the inductor through the high side switch, and discharging is caused when the low side switch is closed by electrically coupling the inductor to the sense node through the low side switch.

Yet other embodiments of the present invention provide methods for switching a regulator. Such methods include providing a regulator circuit with a high side switch, a low side switch, and a sense node that has a value representative of a combination of the current provided by the high side switch and the low side switch. The methods further include providing a current feedback circuit that includes a current feedback node that is electrically coupled to the regulator circuit, and an operational amplifier. The operational amplifier includes two inputs with the first of the inputs being electrically coupled to a power source via a first resistor, and the second of the inputs being electrically coupled to a ground via a second resistor. The method further includes closing a first switch and a third switch such that the first input is additionally electrically coupled to the ground via a third resistor, and the second input is additionally electrically coupled to the sense node via a fourth resistor. Subsequently, a second and a fourth switches are closed such that the first input is additionally electrically coupled to the sense node via the third resistor, and the second input is additionally electrically coupled to the power source via the fourth resistor.

In some instances of the aforementioned embodiments, closing the first switch and the third switch is done at approximately the same time as closing the high side switch, and closing the second switch and the fourth switch is done at approximately the same time as closing the low side switch. In such cases, the high side switch and the low side switch may be configured such that they are not closed at the same time. In particular cases, the regulator circuit further includes a comparator that is operable to detect an over-current condition associated with the high side switch. In such cases, the methods further include closing the high side switch and opening the low side switch based on a time delay, and closing the low side switch and opening the high side switch based on the over-current condition. In some cases, the low side switch is closed whenever and over-current condition or an over-voltage condition is indicated. In such cases, the over-current condition may be triggered by a threshold current being achieved in the high side switch, and the over-voltage condition may be in part triggered by a voltage at the current feedback node.

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1:
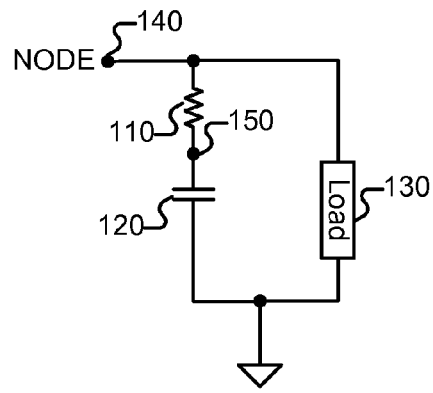
FIG. 1 shows a known output circuit including an external resistor used to provide a current feedback to a switching regulator circuit.

The present invention is related to switching regulators. More particularly, the present invention is related to systems and methods for applying current-mode feedback to a switching regulator.

Some embodiments of the present invention provide current feedback circuits. Such current feedback circuits include a current feedback node and a sense node. As used herein, the term "node" is used in its broadest sense to mean a location in an electrical circuit that exhibits a voltage value and/or current value. Thus, for example, where two elements of the circuit are connected by a wire, both exhibit approximately the same potential and are thus considered the same node. The aforementioned current feedback circuits include an operational amplifier that drives the current feedback node. The inputs of the operational amplifier are electrically coupled to the sense node via switches. As used herein, the phrase "electrically coupled" is used in its broadest sense to mean any coupling whereby an electrical signal or a derivative thereof may be passed between two nodes. Thus, for example, two nodes may be electrically coupled by a wire extending between two nodes. Alternatively, two nodes may be electrically coupled by way of a closed switch and/or a resistor between the two nodes. Inputs of the operational amplifier may be selectably, electrically coupled to the sense node, the power source and/or the ground. As used herein, the phrase "selectably, electrically coupled" is used in its broadest sense to mean any electrical coupling that is conditional. Thus, for example, two nodes may be selectably, electrically coupled via a switch and the condition of the coupling is closure of the switch.

In some cases, the current feedback node is electrically coupled to an input of a switching regulator. The switching regulator may be, but is not limited to, a buck regulator or a buck boost regulator. Based on the disclosure provided herein, one of ordinary skill in the art will recognize a variety of switching regulators that may be used in relation to one or more embodiments of the present invention. In some cases, the switching regulator drives a charge node, and includes both a high side switch and a low side switch. The high side switch is operable to electrically couple the power source to the charge node when the high side switch is closed, and the low side switch is operable to electrically couple the charge node to the ground when the low side switch is closed. In some cases, the charge node and the sense node are electrically connected making the nodes the same node. In particular cases, the second switch closes whenever the low side switch is closed and the third switch is closed whenever the high side switch is closed. Further, the first switch is closed for at least a portion of the time that the high side switch is closed, and the fourth switch is closed for at least a portion of the time that the low side switch is closed. In such cases, the high side switch and the low side switch are not closed at the same time.

Figure 2:
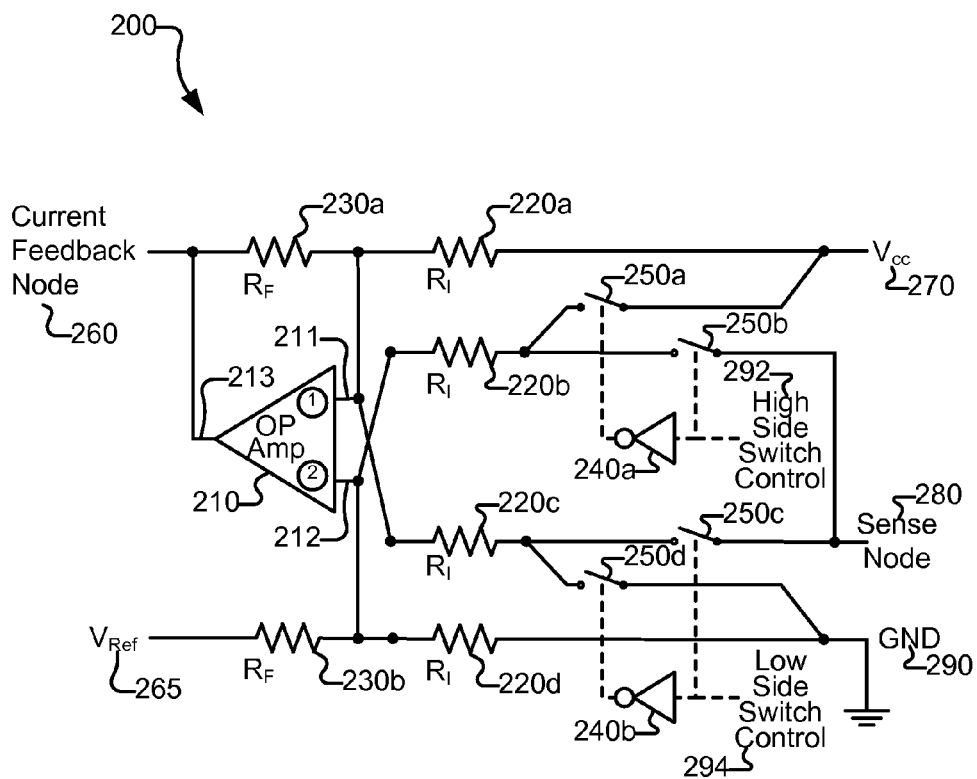
FIG. 2 depicts a current-mode feedback circuit in accordance with various embodiments of the present invention.

Turning to FIG. 2, a current-mode feedback circuit 200 in accordance with various embodiments of the present invention is depicted. Current-mode feedback circuit 200 includes an operational amplifier 210 with two inputs 211, 212. Input 212 is electrically coupled to a ground 290 via a resistor 220d and input 211 is electrically coupled to a power source 270 via a resistor 220a. Further, input 211 is selectably, electrically coupled to a sense node 280 via a switch 250c and a resistor 220c, and to ground 290 via a switch 250d and resistor 220c; and input 212 is selectably, electrically coupled to sense node 280 via a switch 250b and a resistor 220b, and to power source 270 via a switch 250a and resistor 220b. An output 213 of operational amplifier 210 is electrically coupled to a current feedback node 260. As noted by the dashed lines, switch 250b is closed and switch 250a is opened whenever a high side switch control 292 is asserted, and switch 250a is closed and switch 250b is opened whenever high side switch control 292 is de-asserted. Similarly, switch 250c is closed and switch 250d is opened whenever a low side switch control 294 is asserted, and switch 250d is closed and switch 250c is opened whenever low side switch control 294 is de-asserted. In a typical implementation, switches 250 are implemented using MOSFET transistors. Further, current feedback node 260 is electrically coupled to input 211 via a feedback resistor 230a. Another feedback resistor 230b electrically couples input 212 to a reference voltage 265.

One embodiment of the aforementioned circuit is operated by toggling both high side switch control 292 and low side switch control 294 depending upon sensed external conditions. In a typical operation, high side switch control 292 and low side switch control 294 are never asserted at the same time and a small time period extends between the de-assertion of one of the signals and the assertion of the other. In operation, operational amplifier 210 sums the difference of the potential at sense node 280 and power source 270 with the difference of the potential at sense node 280 and ground 290. This sum is provided at current feedback node 260.

Figure 3:
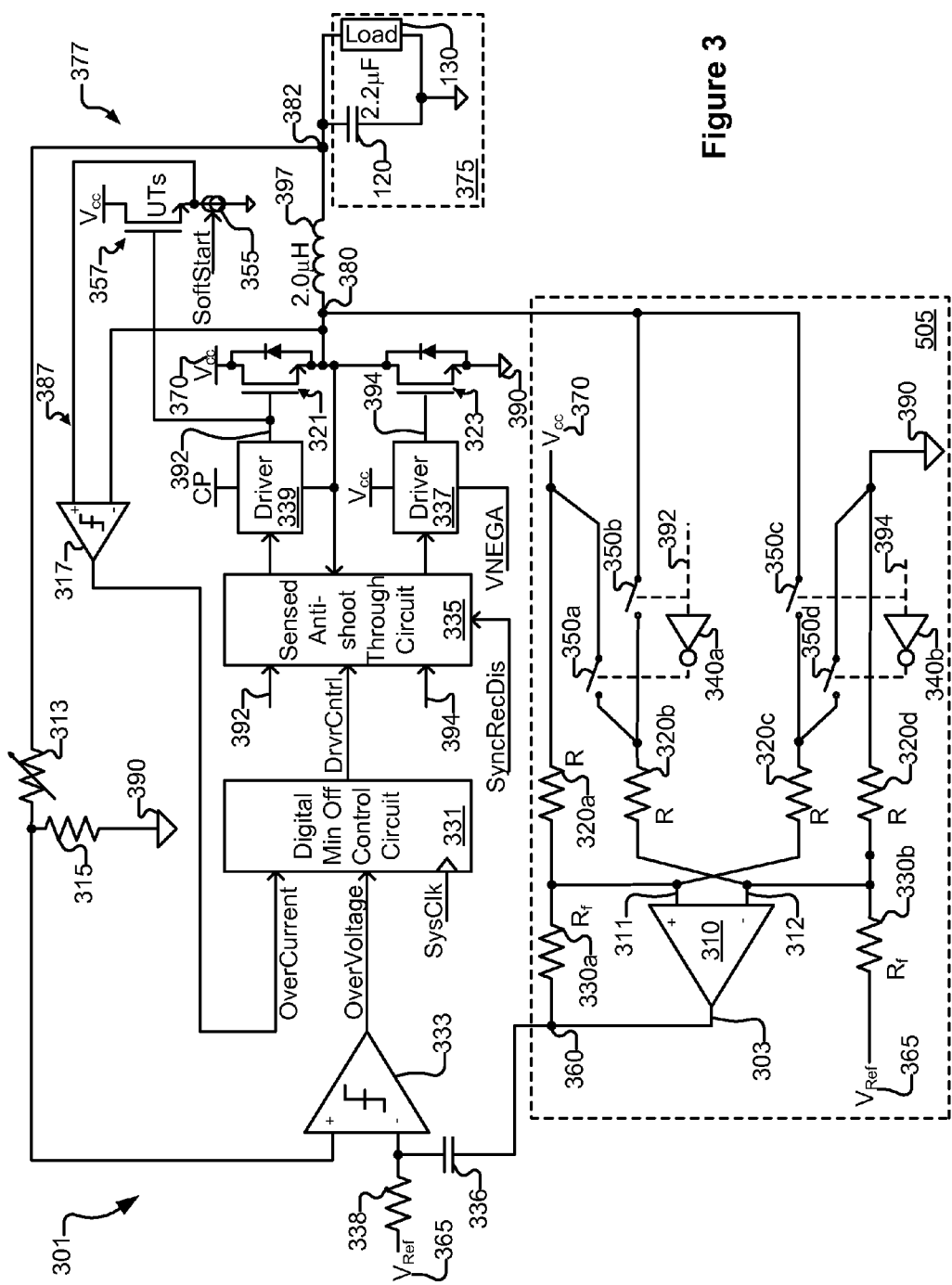
FIG. 3 shows an exemplary switching regulator circuit utilizing a current-mode feedback circuit in accordance with one or more embodiments of the present invention.

FIG. 3 shows an exemplary switching regulator circuit 301 utilizing a current-mode feedback circuit 305 (outlined by a dashed square) in accordance with one or more embodiments of the present invention. As shown, switching regulator circuit 301 is a buck regulator as is known in the art. As one of ordinary skill in the art will appreciate, a positive voltage is used in a buck regulator to create a smaller positive voltage by adjusting the period over which the voltage is applied at the output. Thus, an output voltage between a ground and a power source is achievable. Switching regulator circuit 301 includes a digital minimum off control circuit 331 that drives a sensed anti-shoot through circuit 335. In turn, sensed anti-shoot through circuit 335 controls the assertion of a high side switch control 392 and a low side switch control 394 via drivers 339, 337, respectively. In some cases, sensed anti-shoot through circuit 335 relies on low side switch control 394 to control when high side switch control 392 is asserted, and high side switch control 392 is relied upon by sensed anti-shoot through circuit 335 to control when low side switch control 394 is asserted. This approach assures that high side switch 321 is off before low side switch control 394 is asserted, and that low side switch 323 is off before high side switch control 392 is asserted. High side switch control 392 is applied to the gate of a high side transistor 321 and low side switch control 394 is applied to the gate of a low side transistor 323. The drain of low side transistor 323 and the source of high side transistor 321 are electrically coupled to a sense node 380. Sense node 380 is electrically coupled to an output load 375 via an inductor 397. Output load 375 includes load 130 and capacitor 120 in parallel. Of note, load 375 does not include an effective resistance across which a current may be sensed. Rather, current sensing is accomplished using current-mode feedback circuit 305 that senses a voltage drop across the respective high side transistor 321 and low side transistor 323.

Switching regulator circuit 301 further includes an over-current feedback loop 387 and an over-voltage feedback loop 377. Over-current feedback loop 387 includes a current sense transistor 357 configured to provide a constant current source 355, and a comparator 317. One input of comparator 317 is electrically coupled to sense node 380, and the other input of comparator 317 is electrically coupled to the source of current sense transistor 357. Whenever the voltage potential at sense node 380 is lower than that at the source of current sense transistor 357, an over-current condition is indicated at the output of comparator 317. Over-voltage feedback loop 377 includes a comparator 333 with one input driven by a reference voltage 365 via a resistor 338, and the other input of comparator 333 is driven by an output 382 via a series of resistors 313, 315. Whenever a voltage potential at output 382 as divided through series resistors 313, 315 exceeds that of reference voltage 365, an over-voltage condition is indicated. In some cases, resistor 313 is variable, providing for adjustment of an over-voltage trip point.

As shown, the input of comparator 333 driven by reference voltage 365 is also AC coupled to a current feedback node 360 of current-mode feedback circuit 305 via a capacitor 336. In some cases, the time constant provided by capacitor 336 is much larger than the switching period of switching regulator 301. In one particular case, capacitor 336 provides for a five microsecond time constant. This is an appropriate time constant for a switching frequency of about two megahertz. This filter centers the ripple of current-mode feedback node 360 around reference voltage 365. Further, sense node 380 is electrically coupled to the input of current-mode feedback circuit 305. As connected, current-mode feedback circuit 305 provides an indication of a current provided by switching regulator circuit 301 at sense node 380 (i.e., a voltage representation of the current through high side transistor 321 and low side transistor 323, which directly represents the current through inductor 397). The current is sensed through two different paths included in current-mode feedback circuit 305 with one of the paths designed to sense the current though high side transistor 321 and the other path designed to sense the current through low side transistor 323.

In particular, current-mode feedback circuit 305 includes an operational amplifier 310 with a positive input 312 and a negative input 311. Positive input 312 is electrically coupled to a ground 390 via a resistor 320d and negative input 311 is electrically coupled to a power source 370 via a resistor 320a. Further, negative input 311 is selectably, electrically coupled to sense node 380 via a switch 350c and a resistor 320c, and to ground 390 via a switch 350d and resistor 320c; and positive input 312 is selectably, electrically coupled to sense node 380 via a switch 350b and a resistor 320b, and to power source 370 via a switch 350a and resistor 320b. An output 303 of operational amplifier 310 is connected to current feedback node 360. As noted by the dashed lines, switch 350b is closed and switch 350a is opened whenever a high side switch control 392 is asserted, and switch 350a is closed and switch 350b is opened whenever high side switch control 392 is de-asserted. Similarly, switch 350c is closed and switch 350d is opened whenever a low side switch control 394 is asserted, and switch 350d is closed and switch 350c is opened whenever low side switch control 394 is de-asserted. In a typical implementation, switches 350 are implemented using MOSFET transistors. Further, current feedback node 360 is electrically coupled to negative input 311 via a feedback resistor 330a. Another feedback resistor 330b electrically couples positive input 312 to reference voltage 365.

Each of the sense paths (i.e., the path sensing the current across high side transistor 321 and the path sensing the current across low side transistor 323) operates by detecting the voltage drop across the respective high side transistor 321 or low side transistor 323. The voltage drop is provided by the on-resistance of each of the aforementioned transistors. Hence, the amount of current through the respective transistors going into the inductor will change the voltage drop across the on-resistance. This voltage drop is provided to the inputs of operational amplifier 310 using switches 350. Switches 350 are opened and closed such that when high side transistor 321 is turned on, its corresponding sense path in current-mode feedback circuit 305 is activated. At the same time low side transistor 323 is turned off and its corresponding sense path is disconnected from sense node 380 and is shorted to ground 390. This maintains a consistent common mode level to operational amplifier 310 which minimizes disturbance due to the switching. Similarly, when low side transistor 323 is turned on, its corresponding sense path in current-mode feedback circuit 305 is activated. At the same time high side transistor 321 is turned off and its corresponding sense path is disconnected from sense node 380 and is shorted to power source 370. Again, this maintains a consistent common mode level to operational amplifier 310 which minimizes disturbance due to the switching. The two paths' current representations are summed, referenced to reference voltage 365, and amplified by operational amplifier 310. With appropriate control of switches 350, output 303 of operational amplifier 310 will be maintained at a voltage representation of the current through inductor 397.

The closed-loop gain of operational amplifier 310 is determined based on the amount of current expected in inductor 397, by the regulated voltage at output 382, and the voltage of power source 370. The closed-loop gain of the operational amplifier circuit is equal to: A=Rf/R for each sense path. Note that the two paths could be made to have different gains where high side transistor 321 and low side transistor 323 are of different sizes. In such cases, resistors 320a, 320b, 320c, 320d may be of different sizes. For simplicity, current-mode feedback circuit 305 shows the resistors of approximately the same value (R). However, based on the disclosure provided herein, one of ordinary skill in the art will appreciate a variety of resistor values that may be used to achieve either the same gain for both paths or different gains for each path where the size of high side transistor 321 and low side transistor 323 are different.

Initially both high side switch control 392 and low side switch control 394 are asserted low effectively disconnecting sense node 380 from either power source 370 or ground 390, and the voltage exhibited at sense node 380 is well below reference voltage 365. At this point, digital minimum off control circuit 331 asserts an output indicating that it is time to start charging (i.e., applying a voltage to inductor 397 at sense node 380) to cause the voltage at sense node 380 to increase toward reference voltage 365. In response to the output of minimum off control circuit 331, sensed anti-shoot through circuit 335 causes high side switch control 392 to assert high via driver 339. This causes high side transistor 321 to turn on connecting sense node 380 to power source 370. At this point, current is passed to inductor 397 from power source 370 via transistor 321. During this initial phase there is a potential for the current in inductor 397 to ramp up to very high values. To avoid this situation, the current at sense node 380 is compared by comparator 317 with a reference current represented by current source 355. When the current at sense node 380 becomes too large (i.e., exceeds the reference current), comparator 317 indicates an over-current condition to digital minimum off control circuit 331.

In response to the over-current condition, digital minimum off control circuit 331 asserts an output indicating that it is time to start discharging (i.e., coupling ground to inductor 397 at sense node 380) to reduce the amount of current traversing inductor 397. In response to the output of digital minimum off control circuit 331, sensed anti-shoot through circuit 335 causes high side switch control 392 to de-assert via driver 339, and at some short time later low side switch control 394 is asserted high via driver 337. This causes high side transistor 321 to turn off, and low side transistor 323 to turn on connecting sense node 380 to ground 390. There is a short period between turning off high side transistor 321 and turning on low side transistor 323. This avoids the potential of connecting power source 370 to ground 390 via high side transistor 321 and low side transistor 323. The short period where both high side switch control 392 and low side switch control 394 are de-asserted is maintained as short as possible as the body diode in one or the other of high side transistor 321 and low side transistor 323 will be forced to conduct when both transistors are off. Conducting through the body diodes dissipates much more power than that dissipated through a transistor that is turned on. Sensed anti-shoot through circuit 335 controls the timing of assertion and de-assertion of high side switch control 392 and low side switch control 394. To do so, sensed anti-shoot through circuit 335 monitors the assertion and de-assertion of high side switch control 392 and low side switch control 394.

Once a predetermined time period is exceeded, digital minimum off control circuit 331 again asserts an output indicating that it is time to cause the voltage at sense node 380 to increase toward reference voltage 365 by charging inductor 397. In response to the output of minimum off control circuit 331, sensed anti-shoot through circuit 335 causes low side switch control 394 to de-assert via driver 337, and high side switch control 392 to assert high via driver 339 a short time later. This causes high side transistor 321 to connect sense node 380 to power source 370. At this point, current is passed to inductor 397 from power source 370 via transistor 321. This continues until another over-current condition is achieved at which time high side switch control 392 is de-asserted and low side switch control 394 is asserted.

The process of switching based on the over-current condition continues until the voltage potential at output 382 as divided by the series of resistors 313, 315 nears that of reference voltage 365. During this phase of operation, current-mode feedback circuit 305 adjusts the reference voltage potential at the input of comparator 333 based on the current sensed at sense node 380. In particular, where high side switch control 392 is asserted high, switch 350b and switch 350d are closed. This causes operational amplifier 310 to sum the difference of the potential at sense node 380 (applied to the positive input of operational amplifier 310) and power source 370 (applied to the negative input of operational amplifier 310). In this case, the voltage at current feedback node 360 represents the current across high side transistor 321. When high side switch control 392 is de-asserted and low side switch control 394 is asserted, switch 350a and switch 350c are closed. This causes operational amplifier 310 to sum the difference of the potential at sense node 380 (applied to the negative input of operational amplifier 310) and power source 370 (applied to the positive input of operational amplifier 310). In this case, the voltage at current feedback node 360 represents the current across low side transistor 323. As shown, whether high side transistor 321 or low side transistor 323 is turned on, current feedback node 360 (i.e., the output of operational amplifier 310) provides a scaled version of the current traversing inductor 397.

The AC portion of current feedback node 360 is summed with reference voltage 365, and compared with the voltage potential at output 382 as it is divided by the series of resistors 313, 315. At some point, the voltage potential at output 382 rises such that comparator 333 indicates an over-voltage condition to digital minimum off control circuit 331. Upon indication of the over-voltage condition, digital minimum off control circuit 331 asserts an output indicating that it is time to start discharging (i.e., coupling ground to inductor 397 at sense node 380) to reduce the amount of current traversing inductor 397. In response to the output of digital minimum off control circuit 331, sensed anti-shoot through circuit 335 causes high side switch control 392 to de-assert via driver 339, and at some short time later low side switch control 394 is asserted high via driver 337. This causes high side transistor 321 to turn off, and low side transistor 323 to connect sense node 380 to ground 390. Again, there is a short period between turning off high side transistor 321 and turning on low side transistor 323.

Once a predetermined time period is exceeded, digital minimum off control circuit 331 again asserts an output indicating that it is time to cause the voltage at sense node 380 to increase toward reference voltage 365 by charging inductor 397 through high side transistor 321. In response to the output of minimum off control circuit 331, sensed anti-shoot through circuit 335 causes low side switch control 394 to de-assert via driver 337, and high side switch control 392 to assert high via driver 339 a short time later. This causes high side transistor 321 to connect sense node 380 to power source 370. At this point, current is passed to inductor 397 from power source 370 via transistor 321. This continues until another overvoltage condition is achieved at which time high side switch control 392 is de-asserted and low side switch control 394 is asserted.

As will be appreciated from the preceding discussion, the feedback current is measured across high side transistor 321 and low side transistor 323 rather than across a resistor as was previously known. Thus, the sensed current-mode feedback implemented in relation to switched regulator 301 uses the on resistance of both high side transistor 321 and low side transistor 323. Thus, an effective output resistance may be eliminated which results in savings in both components and power dissipation. Current-mode feedback node 360 causes the reference input of comparator 333 to ripple according to the current through inductor 397. The closed-loop gain of operational amplifier 310 needs to be such that the peak-to-peak voltage of the signal provided by current-mode feedback node 360 is greater than the sensed peak-to-peak voltage ripple of the output across all valid regulator loads and also larger than the hysteresis in the voltage comparator. This voltage ripple will enforce a very regular switching frequency for the regulator. Without any form of current-mode feedback, the ripple of the output voltage of the switching regulator would be used. The problem with using this feedback approach is that the output voltage will lag the inductor current. This lag can cause a situation where current will build up in inductor 397 to a point where even if high side transistor 321 is turned off, the voltage will still ramp to a much higher level. In that case, the voltage ripple of the output of the switching regulator will be much greater. This is undesirable and it may not be possible to compensate for the increase by increasing the size of capacitor 120 as is normally possible in a switching regulator.

Figure 4:
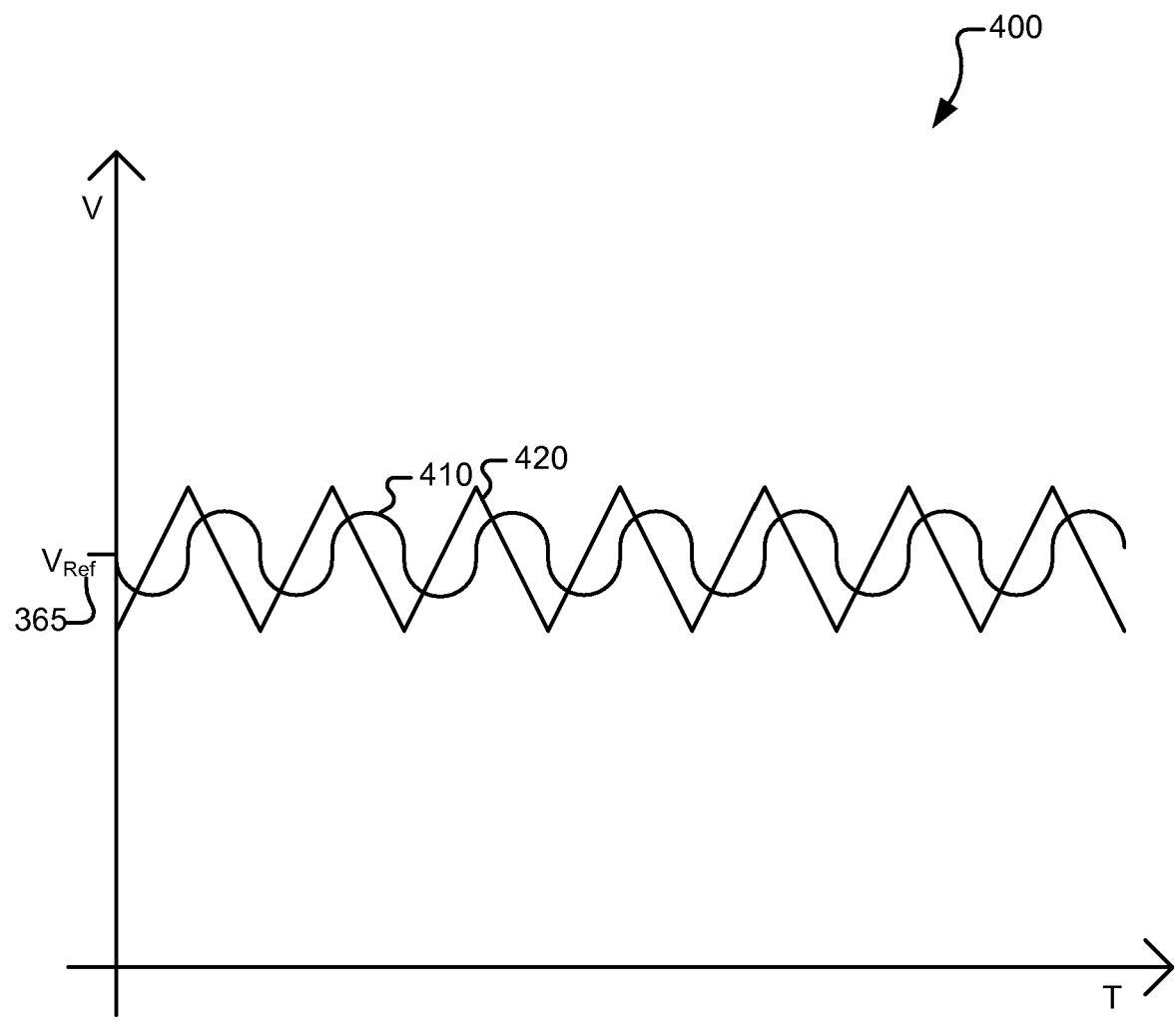
FIG. 4 shows waveforms obtainable through use of the circuit of FIG. 2 and in accordance with various embodiments of the present invention.

Turning to FIG. 4 a set of wave forms 400 obtainable through use of the circuit of FIG. 3 is depicted in accordance with various embodiments of the present invention. In particular, a rounded waveform 410 represents the voltage at output 382, and a triangle waveform 420 represents the AC coupled value of current feedback node 360 added to reference voltage 365 at the input of comparator 333. The AC coupled value of current feedback node 360 reflects the current passing through inductor 397. For larger values of capacitor 120, the amplitude of waveform 410 is reduced. Of note, where no current mode feedback is used for current sensing, increasing the size of capacitor 120 decreases the switching frequency of switching regulator circuit 301. This decrease in frequency allows inductor to charge up to a greater current, thereby decreasing the efficiency of switching regulator 301. The aforementioned condition would be true for a case where no current mode feedback is used but would not be the case for the sense resistor case. In contrast, by using current-mode feedback circuit 305 the switching frequency becomes largely independent of the size of capacitor 120. This allows a greater deal of flexibility in designing switching regulator circuit 301.

Figure 5:
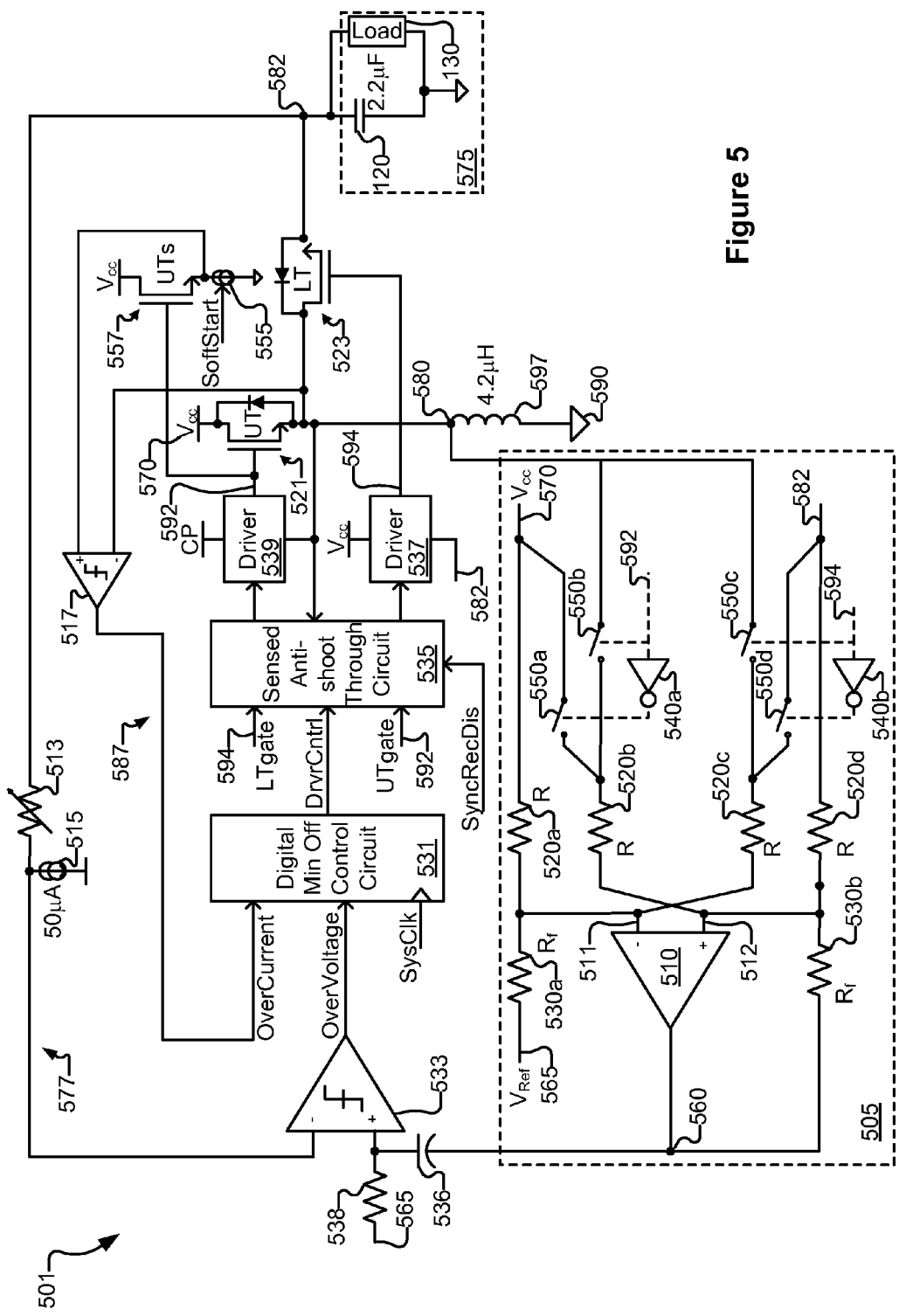
FIG. 5 depicts another exemplary switching regulator circuit utilizing another current-mode feedback circuit in accordance with other embodiments of the present invention.

Turning to FIG. 5, another exemplary switching regulator circuit 501 utilizing another current-mode feedback circuit 505 (outlined by a square of dashed lines) is depicted in accordance with other embodiments of the present invention. As shown, switching regulator circuit 501 is a buck boost negative regulator as is known in the art. As one of ordinary skill in the art will appreciate, any voltage below the power source is achievable using a buck boost regulator. For switching regulator 501 the sensed current is inverted in an operational amplifier 510 of current-mode feedback circuit 505 to provide the proper current mode ripple in the reference to obtain a regular switching frequency and to increase efficiency. Note that with a buck boost negative regulator a series resistor added in series with the output capacitor will not provide the proper current mode feedback as it does in a positive regulator such as shown in FIG. 1. This is because the inductor current does not flow into the output capacitor continuously. Without the present invention, in order to achieve current mode feedback in a negative buck boost regulator a resistor would need to be added in series with the inductor and the voltage across this resistor would need to be sensed and fed back into the system somehow. This would add complexity and pins; and would decrease efficiency due to the power loss in the resistor.

Switching regulator circuit 501 includes a digital minimum off control circuit 531 that drives a sensed anti-shoot through circuit 535. In turn, sensed anti-shoot through circuit 535 controls the assertion of a high side switch control 592 and a low side switch control 594 via drivers 539, 537, respectively. High side switch control 592 is applied to the gate of a high side transistor 521 and low side switch control 594 is applied to the gate of a low side transistor 523. The drain of low side transistor 523 and the source of high side transistor 521 are electrically coupled to a sense node 580. Sense node 580 is electrically coupled to a ground 590 via an inductor 597. The drain of high side transistor 521 is electrically coupled to a power source 570, and the source of low side transistor 523 is electrically coupled to an output load 575. Output load 575 includes load 130 and capacitor 120 in parallel. Of note, load 575 does not include an effective resistance in series with inductor 597 across which a current may be sensed. Rather, current sensing is accomplished using current-mode feedback circuit 505.

Switching regulator circuit 501 further includes an over-current feedback loop 587 and an over-voltage feedback loop 377. Over-current feedback loop 387 includes a current sense transistor 557 configured to provide a constant current source 555, and a comparator 517. One input of comparator 517 is electrically coupled to sense node 580, and the other input of comparator 517 is electrically coupled to the source of current sense transistor 557. Whenever the voltage potential at sense node 580 is lower than that at the source of current sense transistor 557, an over-current condition is indicated at the output of comparator 517. Over-voltage feedback loop 577 includes a comparator 533 with one input driven by a reference voltage 565 via a resistor 538, and the other input of comparator 533 is driven by an output 582 via a series of a constant current source 515 and a resistor 513. In some cases, resistor 513 is variable as shown. Whenever a voltage potential at output 582 as level shifted through the series of resistors 513 and constant current source 515 exceeds that of reference voltage 565, an over-voltage condition is indicated.

As shown, the input of comparator 533 driven by reference voltage 565 is also electrically coupled to a current feedback node 560 of current-mode feedback circuit 505 via a capacitor 536. Further, sense node 580 is electrically coupled to the input of current-mode feedback circuit 505. As connected, current-mode feedback circuit 505 provides an indication of a current provided by switching regulator circuit 501 at sense node 580.

Current-mode feedback circuit 505 includes an operational amplifier 510 with a positive input 512 and a negative input 511. Positive input 512 is electrically coupled to output 582 via a resistor 520d and negative input 511 is electrically coupled to power source 570 via a resistor 520a. Further, negative input 511 is selectably, electrically coupled to sense node 580 via a switch 550c and a resistor 520c, and to output 582 via a switch 550d and resistor 520c; and negative input 512 is selectably, electrically coupled to sense node 580 via a switch 550b and a resistor 520b, and to power source 570 via a switch 550a and resistor 520b. An output 503 of operational amplifier 510 is connected to current feedback node 360. As noted by the dashed lines, switch 550b is closed and switch 550a is opened whenever a high side switch control 592 is asserted, and switch 550a is closed and switch 550b is opened whenever high side switch control 592 is de-asserted. Similarly, switch 550c is closed and switch 550d is opened whenever a low side switch control 594 is asserted, and switch 550d is closed and switch 550c is opened whenever low side switch control 594 is de-asserted. In a typical implementation, switches 550 are implemented using MOSFET transistors. Further, current feedback node 560 is electrically coupled to positive input 512 via a feedback resistor 530b. Another feedback resistor 530a electrically couples positive input 512 to reference voltage 565.

Initially both high side switch control 592 and low side switch control 594 are asserted low effectively disconnecting sense node 580 from either power source 570 or output 582, and the voltage exhibited at sense node 580 is dictated by the energy stored in inductor 597. At this point, digital minimum off control circuit 531 asserts an output indicating that it is time to start charging (i.e., applying a voltage to inductor 597 at sense node 580 via high side transistor 521) to cause the voltage at sense node 580 to increase toward reference voltage 565. In response to the output of minimum off control circuit 531, sensed anti-shoot through circuit 535 causes high side switch control 592 to assert high via driver 539. This causes high side transistor 521 to connect sense node 580 to power source 570. At this point, current is passed to inductor 597 from power source 570 via transistor 521. During this initial phase there is a potential for the current in inductor 597 to ramp up to very high values. To avoid this situation, the current at sense node 580 is compared by comparator 517 with a reference current represented by current source 555. When the current at sense node 580 becomes too large (i.e., exceeds the reference current), comparator 517 indicates an over-current condition to digital minimum off control circuit 531.

In response to the over-current condition, digital minimum off control circuit 531 asserts an output indicating that it is time to start discharging (i.e., coupling output 582 to inductor 397 via low side transistor 523). In this condition, current is pulled from capacitor 120 and provided to inductor 597. Removing charge from capacitor 120 causes output 582 to go more negative. Thus, depending upon the duty cycle of high side switch control 592 and low side switch control 594, a desired voltage below power source 570 at output 582 is achievable. In response to the output of digital minimum off control circuit 531, sensed anti-shoot through circuit 535 causes high side switch control 592 to de-assert via driver 539, and at some short time later low side switch control 594 is asserted high via driver 537. This causes high side transistor 521 to turn off, and low side transistor 523 to connect sense node 580 to output 582. Sensed anti-shoot through circuit 535 controls the timing of assertion and de-assertion of high side switch control 592 and low side switch control 594. To do so, sensed anti-shoot through circuit 535 monitors the assertion and de-assertion of high side switch control 592 and low side switch control 594.

Once a predetermined time period is exceeded, digital minimum off control circuit 531 again asserts an output indicating that it is time to start charging to cause the voltage at sense node 580 to increase toward reference voltage 565. In response to the output of minimum off control circuit 531, sensed anti-shoot through circuit 535 causes low side switch control 594 to de-assert via driver 537, and high side switch control 592 to assert high via driver 539 a short time later. This causes high side transistor 521 to connect sense node 580 to power source 570. At this point, current is passed to inductor 597 from power source 570 via transistor 521. This continues until another over-current condition is achieved at which time high side switch control 592 is de-asserted and low side switch control 594 is asserted.

The process of switching based on the over-current condition continues until the voltage potential at output 582 as divided by the series of constant current source 515 and resistor 513 nears that of reference voltage 565. During this phase of operation, current-mode feedback circuit 505 adjusts the reference voltage potential at the input of comparator 533 based on the current sensed at sense node 580. In particular, where high side switch control 592 is asserted high, switch 550b and switch 550d are closed. This causes operational amplifier 510 to sum the difference of the potential at sense node 580 (applied to the positive input of operational amplifier 510) and power source 570 (applied to the positive input of operational amplifier 510). When high side switch control 592 is de-asserted and low side switch control 594 is asserted, switch 550a and switch 550c are closed. This causes operational amplifier 510 to sum the difference of the potential at sense node 580 (applied to the negative input of operational amplifier 510) and output 582 (applied to the positive input of operational amplifier 310).

Current feedback node 560 is summed with reference voltage 565, and compared with the voltage potential at output 582 as it is level shifted by the series of constant current source 515 and resistor 513. At some point, the voltage potential at output 582 falls such that comparator 533 indicates an over-voltage condition to digital minimum off control circuit 531. Upon indication of the over-voltage condition, digital minimum off control circuit 531 asserts an output indicating that it is time to start discharging (i.e., coupling output 582 to inductor 597 at sense node 580) to reduce the amount of current traversing inductor 597. In response to the output of digital minimum off control circuit 531, sensed anti-shoot through circuit 535 causes high side switch control 592 to de-assert via driver 539, and at some short time later low side switch control 594 is asserted high via driver 537. This causes high side transistor 521 to turn off, and low side transistor 523 to connect sense node 580 to output 582.

Once a predetermined time period is exceeded, digital minimum off control circuit 531 again asserts an output indicating that it is time to start charging to cause the voltage at sense node 582 to increase toward reference voltage 565. In response to the output of minimum off control circuit 531, sensed anti-shoot through circuit 535 causes low side switch control 594 to de-assert via driver 537, and high side switch control 592 to assert high via driver 539 a short time later. This causes high side transistor 521 to connect sense node 580 to power source 570. At this point, current is passed to inductor 597 from power source 570 via transistor 521. This continues until another over-voltage condition is achieved at which time high side switch control 592 is de-asserted and low side switch control 594 is asserted.

In conclusion, the present invention provides novel systems, devices, methods and arrangements for current feedback implementation. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A current feedback circuit, wherein the current feedback circuit comprises:
    a current feedback node;
    a sense node; and
    an operational amplifier; wherein the operational amplifier includes a first input and a second input; wherein the first input is electrically coupled to a power source via a first resistor, and wherein the first input is selectably, electrically coupled to a ground via a first switch, and to the sense node via a second switch; wherein the second input is electrically coupled to the ground via a second resistor, and wherein the second input is selectably, electrically coupled to the sense node via a third switch, and to the power source via a fourth switch; and wherein an output of the operational amplifier drives the current feedback node.

2. The current feedback circuit of claim 1, wherein the first input is selectably, electrically coupled to the ground via the first switch and a third resistor, wherein the second input is selectably, electrically coupled to the power source via the fourth switch and a fourth resistor, wherein the first input is selectably, electrically coupled to the sense node via the second switch and the third resistor, and wherein second input is selectably, electrically coupled to the sense node via the third switch and the fourth resistor.

3. The current feedback circuit of claim 2, wherein the third resistor and the fourth resistor are of approximately the same value.

4. The current feedback circuit of claim 3, wherein the first resistor and the second resistor are each of approximately the same value as the third resistor.

5. The current feedback circuit of claim 1, wherein a first feedback resistor electrically couples the first input to the current feedback node, and wherein a second feedback resistor electrically couples the second input to a reference voltage.

6. The current feedback circuit of claim 5, wherein the first feedback resistor and the second feedback resistor are approximately the same value.

7. The current feedback circuit of claim 1, wherein the first input is selectably, electrically coupled to the ground via the first switch and a third resistor, wherein the second input is selectably, electrically coupled to the power source via the fourth switch and a fourth resistor, wherein the first input is selectably, electrically coupled to the sense node via the second switch and the third resistor, wherein second input is selectably, electrically coupled to the sense node via the third switch and the fourth resistor, wherein a first feedback resistor electrically couples the first input to the current feedback node, wherein a second feedback resistor electrically couples the second input to a reference voltage, and wherein the current feedback node is electrically coupled to a reference voltage input of a switching regulator.

8. The current feedback circuit of claim 7, wherein the switching regulator is a buck boost regulator.

9. The current feedback circuit of claim 7, wherein the switching regulator is a buck regulator.

10. The current feedback circuit of claim 7, wherein the switching regulator drives a charge node, wherein the switching regulator includes a high side switch and a low side switch, wherein the high side switch is operable to electrically couple the power source to the charge node when the high side switch is closed, and wherein the low side switch is operable to electrically couple the charge node to the ground when the low side switch is closed.

11. The current feedback circuit of claim 10, wherein the charge node and the sense node are the same node.

12. The current feedback circuit of claim 10, wherein the second switch is closed when the low side switch is closed, wherein the third switch is closed when the high side switch is closed, wherein the first switch is closed for at least a portion of the time that the high side switch is closed, and wherein the fourth switch is closed for at least a portion of the time that the low side switch is closed.

13. The current feedback circuit of claim 7, wherein the switching regulator drives a charge node, wherein the switching regulator includes a high side switch and a low side switch, wherein the high side switch is operable to electrically couple the power source to the charge node when the high side switch is closed, wherein the low side switch is operable to electrically couple the charge node to an output node when the low side switch is closed, and wherein an inductor electrically couples the charge node to the ground.

14. The current feedback circuit of claim 13, wherein the output node and the sense node are the same node.

15. The current feedback circuit of claim 13, wherein the second switch is closed when the low side switch is closed, wherein the third switch is closed when the high side switch is closed, wherein the first switch is closed for at least a portion of the time that the high side switch is closed, and wherein the second switch is closed for at least a portion of the time that the low side switch is closed.

16. A current feedback, switching regulator circuit, wherein the circuit comprises:
 a regulator circuit, wherein the regulator circuit includes:
  a high side switch, wherein the high side switch is operable to cause charging when closed; and
  a low side switch, wherein the low side switch is operable to cause discharging when closed; and
 a current feedback circuit, wherein the current feedback circuit includes:
  a current feedback node, wherein a value of the current feedback node drives switching of the high side switch and the low side switch;
  a sense node, wherein a value of the sense node is representative of a current provided via a combination of the high side switch and the low side switch; and
  an operational amplifier; wherein the operational amplifier includes a first input and a second input; wherein the first input is electrically coupled to a power source via a first resistor, and wherein the first input is selectably, electrically coupled to a ground via a first switch and a third resistor, and to the sense node via a second switch and the third resistor; wherein the second input is electrically coupled to the ground via a second resistor, and wherein the second input is selectably, electrically coupled to the sense node via a third switch and a fourth resistor, and to the power source via a fourth switch and the fourth resistor; and wherein an output of the operational amplifier drives the current feedback node.

17. The circuit of claim 16, wherein the high side switch and the low side switch are electrically coupled to the sense node; wherein charging is caused when the high side switch is closed by electrically coupling the power source to the sense node through the high side switch; and wherein discharging is caused when the low side switch is closed by electrically coupling the ground to the sense node through the low side switch.

18. The circuit of claim 16, wherein the high side switch and the low side switch are electrically coupled to a charging node, wherein the charging node is electrically coupled to the ground via an inductor; wherein charging is caused when the high side switch is closed by electrically coupling the power source to the inductor through the high side switch; and wherein discharging is caused when the low side switch is closed by electrically coupling the inductor to the sense node through the low side switch.

19. A method for switching a regulator, the method comprising:
 providing a regulator circuit, wherein the regulator circuit includes:
  a high side switch; and
  a low side switch; and
  a sense node, wherein a value of the sense node is representative of a current provided via a combination of the high side switch and the low side switch;
 providing a current feedback circuit, wherein the current feedback circuit includes:
  a current feedback node, wherein the current node is electrically coupled to the regulator circuit; and
  an operational amplifier, wherein the operational amplifier includes a first input and a second input, wherein the first input is electrically coupled to a power source via a first resistor, and wherein the second node is electrically coupled to a ground via a second resistor;
 closing a first switch and a third switch, wherein the first input is additionally electrically coupled to the ground via a third resistor, and wherein the second input is additionally electrically coupled to the sense node via a fourth resistor; and
 closing a second switch and a fourth switch, wherein the first input is additionally electrically coupled to the sense node via the third resistor, and wherein the second input is additionally electrically coupled to the power source via the fourth resistor.

20. The method of claim 19, wherein the regulator circuit further includes a comparator, wherein the comparator is operable to detect an over-current condition associated with the high side switch, and wherein the method further comprises:
 closing the high side switch and opening the low side switch based on a time delay; and
 closing the low side switch and opening the high side switch based on the over-current condition.

21. The method of claim 19, wherein closing the first switch and the third switch is done at approximately the same time as closing the high side switch; and wherein closing the second switch and the fourth switch is done at approximately the same time as closing the low side switch.

22. The method of claim 21, wherein the high side switch and the low side switch do not close at the same time.

23. The method of claim 21, wherein the low side switch is closed whenever an over-current condition or an over-voltage condition is indicated.

24. The method of claim 23, wherein the over-current condition is triggered by a threshold current being achieved in the high side switch, and wherein the over-voltage condition is in part triggered by a voltage at the current feedback node.

* * * * *